(12) United States Patent  
Miyazaki et al.

(10) Patent No.: US 8,677,583 B2  
(45) Date of Patent: Mar. 25, 2014

(54) MACHINE TOOL

(75) Inventors: Masaaki Miyazaki, Kanagawa (JP); Yoshitaka Yamaguchi, Kanagawa (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 676 days.

(21) Appl. No.: 12/920,135

(22) PCT Filed: Mar. 14, 2008

(86) PCT No.: PCT/JP2008/055193  
§ 371 (c)(1),  
(2), (4) Date: Aug. 30, 2010

(87) PCT Pub. No.: WO2009/113186  
PCT Pub. Date: Sep. 17, 2009

(65) Prior Publication Data  
US 2011/0008121 A1     Jan. 13, 2011

(51) Int. Cl.
| | | |
|---|---|---|
| B23Q 7/00 | (2006.01) | |
| B23Q 11/12 | (2006.01) | |
| B23D 7/00 | (2006.01) | |
| B23B 47/00 | (2006.01) | |

(52) U.S. Cl.  
USPC ............. 29/33 P; 409/135; 409/235; 408/234

(58) Field of Classification Search  
CPC ........ B23B 39/14; B23Q 11/127; B23Q 1/70; B23Q 11/10; B23Q 1/015; B23Q 11/0014; B23Q 7/1431; B23C 1/12

USPC .......... 408/234; 409/135, 136, 235, 236, 238, 409/239; 29/33 P  
See application file for complete search history.

(56) References Cited

U.S. PATENT DOCUMENTS

| | | | |
|---|---|---|---|
| 3,623,274 A | 11/1971 | Voumard | |
| 6,273,653 B1 | 8/2001 | Horn et al. | |
| 6,553,875 B1 | 4/2003 | Miyano | |
| 7,223,055 B2 * | 5/2007 | Toncelli | ........................ 409/235 |
| 2003/0103825 A1 | 6/2003 | Muto | |

FOREIGN PATENT DOCUMENTS

| | | | | |
|---|---|---|---|---|
| DE | 19645324 A1 * | 5/1998 | ............... | B23Q 1/01 |
| JP | 62-25122 | 2/1987 | | |
| JP | 2002239857 A | 8/2002 | | |
| JP | 2003231031 A | 8/2003 | | |
| JP | 2006341328 A | 12/2006 | | |
| JP | 3939095 | 4/2007 | | |

* cited by examiner

*Primary Examiner* — Sarang Afzali  
(74) *Attorney, Agent, or Firm* — Paul and Paul

(57) ABSTRACT

Machine tool (11) comprises spindle supporting side structure (13) erected on a floor surface for supporting spindle (15) having tool (T) mounted thereon and work supporting side structure (17) erected on the floor surface in opposition to spindle supporting side structure (13) for supporting work (W), and is used to machine the work by relative motion of tool (T) and work (W). An upper end of spindle supporting side structure (13) and an upper end of work supporting side structure (17) are connected to interconnection member (41).

4 Claims, 2 Drawing Sheets

Exhibit "A"

Exhibit "A"

MACHINE TOOL

FIELD OF THE INVENTION

The present invention relates to a machine tool in which a work is machined by relative movement of a tool mounted on a spindle supported by a spindle supporting side structure relative to the work supported by a work supporting side structure disposed in opposition to the spindle supporting side structure.

BACKGROUND ART

In recent years, aircrafts are becoming larger due to the increasing number of joined parts. In order to machine such a large sized component, a machine tool such as disclosed in Japanese Patent No. 3939095 is often utilized which comprises a spindle supporting side structure erected on a floor surface for movably supporting a spindle and a work supporting side structure for supporting a work also erected on the floor surface in opposition to the spindle supporting side structure and in which the work is machined by relative movement of a tool mounted on the spindle supported by the spindle supporting side structure and the work supported by the work supporting side structure.

The spindle supporting side structure and the work supporting side structure as described above are generally large, and have a cantilever configuration with one end on the floor surface side fixed to the floor surface and with the other opposite, upper end being free. Thus, when a force or cutting load is imposed between the spindle supporting side structure and the work supporting side structure via contact of the tool with the work at the time of machining, deflection may be produced in the spindle supporting side structure as well as in the work supporting side structure. In particular, the higher the position of the action point of the force, the larger is the amount of deflection or deformation of the spindle supporting side structure and the work supporting side structure. Deflection may also be produced by local thermal deformation of the spindle supporting side structure and the work supporting side structure due to temperature variation in the room in which the machine tool is installed. The amount of the deformation is largest at the upper, free end of the structures. Further, deformation of these structures may be produced due to the weight or the movement of the spindle supported by the spindle supporting side structure as well as of the work supported by the work supporting side structure.

A problem arises that, if the relative distance between the upper end of the spindle supporting side structure and the upper end of the work supporting side structure changes in this manner due to deformation of the spindle supporting side structure and the work supporting side structure, error may be produced in the relative positional relation of the spindle and the tool relative to the work, which may cause degradation of machining precision. In particular, when the deflection of the spindle supporting side structure occurs in an opposite direction to the deflection of the work supporting side structure, the change in the relative distance between the upper end of the spindle supporting side structure and the upper end of the work supporting side structure becomes large so that the adverse influence on the machining precision also may become large.

DISCLOSURE OF THE INVENTION

Therefore, it is an object of the present invention to suppress influence of deformation of a spindle supporting side structure and a work supporting side structure disposed in opposition to each other on machining precision in a machine tool.

In accordance with the present invention, there is provided a machine tool for machining a work by relative movement of a tool and a work, comprising a spindle supporting side structure that is erected on a floor surface and supports a spindle having a tool mounted thereon and a work supporting side structure that is also erected on the floor surface in opposition to the spindle supporting structure and supports a work, wherein an upper end of the spindle supporting side structure and an upper end of the work supporting side structure are connected to each other with an interconnection member.

In the above-mentioned machine tool, it is preferable that a fluid channel is provided in the inside of the interconnection member and temperature of the fluid flowing through the fluid channel is controlled so as to maintain a constant length of the interconnection member.

For example, temperature of the fluid flowing through the fluid channel may be controlled so as to maintain the temperature of the interconnection member within a predetermined range, or temperature of the fluid flowing through the fluid channel may be controlled so as to offset the elongation or contraction of the interconnection member due to external force exerted to the interconnection member.

In accordance with the present invention, the upper end of the spindle supporting side structure and the upper end of the work supporting side structure are connected to each other by the interconnection member, so that, even if deflection is produced by deformation of respective structures, relative positional relation between respective upper ends is constrained so as to suppress change of relative position, making highly precise machining possible.

BRIEF DESCRIPTION OF THE DRAWINGS

Above and other object, features, and advantages of the present invention will be described in detail below with reference to appended drawings showing embodiments thereof. In the drawings.

BEST FORM FOR CARRYING OUT THE INVENTION

Figure 1:
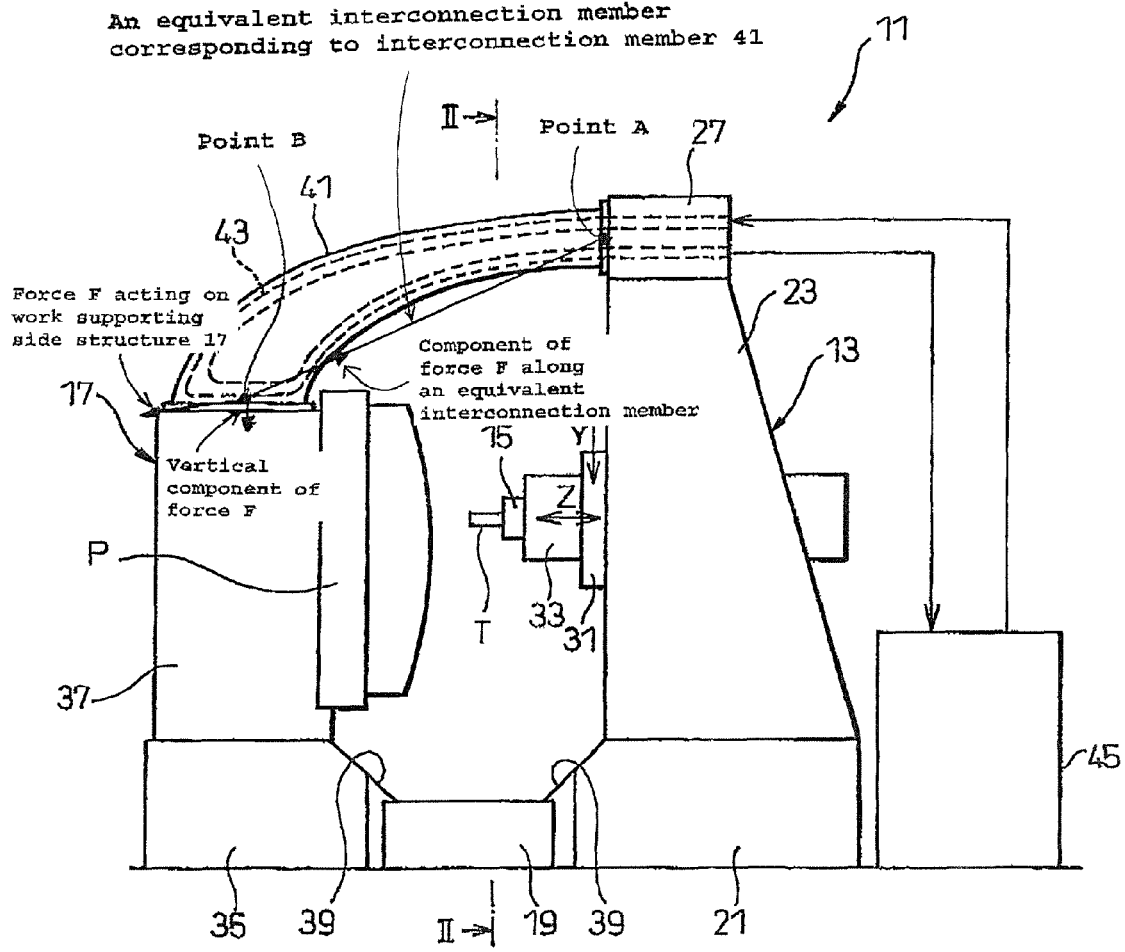
FIG. 1 is a side view showing a machine tool according to the present invention.

A preferred embodiment of a machine tool according to the present invention will be described below with reference to appended drawings. In the description that follows, the term "front side" refers to the side having machining function and the term "rear side" refers to the side opposite to the side having machining function. As shown in FIG. 1, X-axis direction is defined as a longitudinal direction or left-right direction of a machine tool, and Y-axis is defined as a vertical direction or up-down direction, and Z-axis direction is defined as a direction orthogonal to both X-axis and Y-axis directions, i.e., forward-backward direction.

Figure 2:
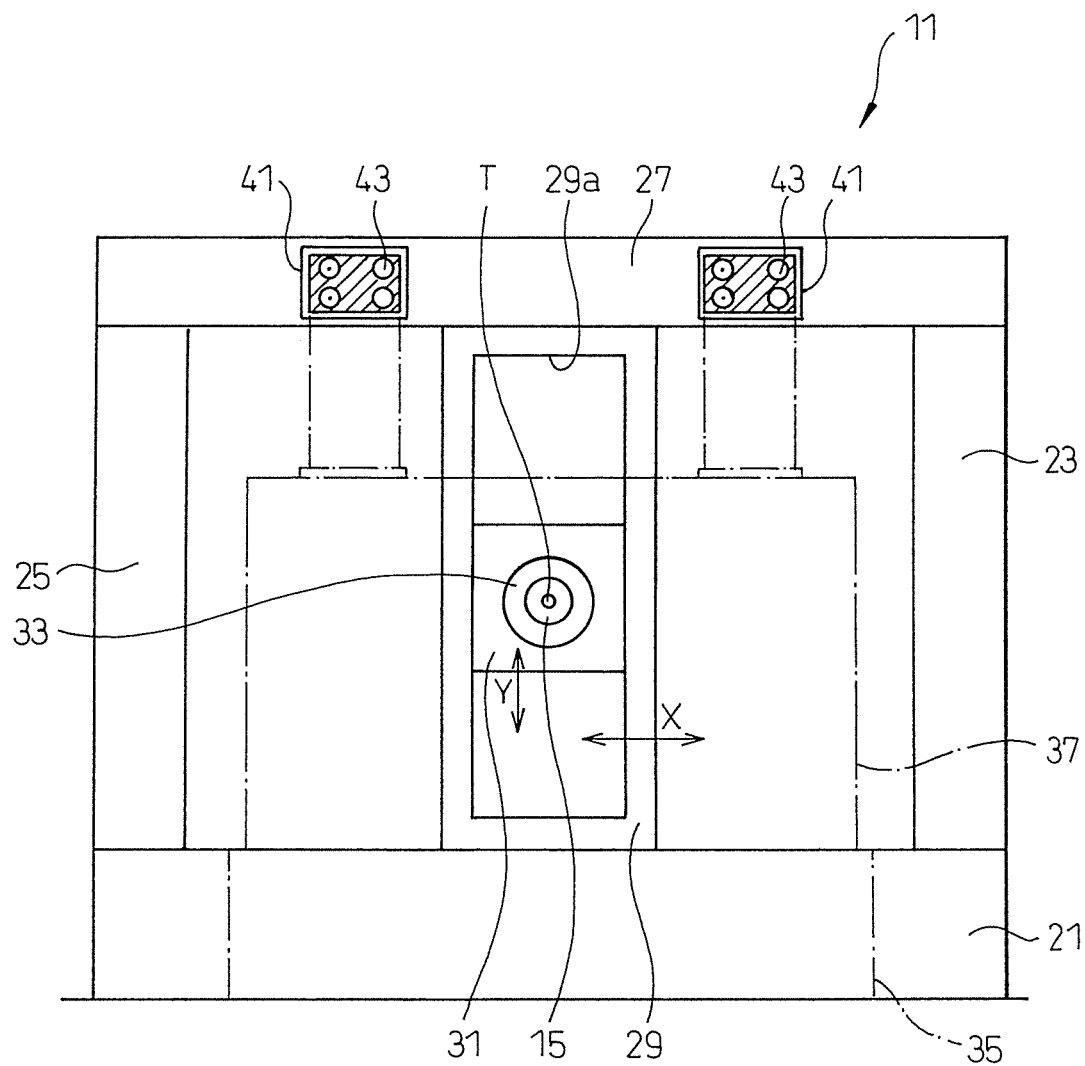
FIG. 2 is a sectional view taken along line II-II of FIG. 1 as seen from the direction of the arrow.

Referring to FIGS. 1 and 2, machine tool 11 comprises spindle supporting side structure 13 that is erected on a floor surface for supporting spindle 15 movably along X-axis, Y-axis and Z-axis directions, work supporting side structure 17 that is also erected on the floor surface in opposition to spindle supporting side structure 13 for supporting work W, and chip conveyor 19 provided between spindle supporting side structure 13 and work supporting side structure 17 as means for removing chips.

Spindle supporting side structure 13 comprises rear bed 21 fixedly provided on the floor surface, right column 23 erected on the right end of rear bed 21 as seen from the side of work supporting side structure 17, left column 25 erected on the left end of rear bed 21 as seen from the side of work supporting side structure 17, cross beam 27 extending in a horizontal direction so as to connect the upper end of right column 23 and the upper end of left column 25, X-axis slider 29 supported between rear bed 21 and cross beam 27 movably along X-axis direction (left-right direction), Y-axis slider 31 supported on X-axis slider 29 movably along Y-axis direction (vertical direction), spindle head 33 supported on Y-axis slider 31 movably along Z-axis direction, and spindle 15 supported rotatably on spindle head 33 for mounting tool T thereon.

Right column 23, left column 25 and cross beam 27 may be formed as separate constituents, or right column 23, left column 25 and cross beam 27 may be formed integrally in one unit, for example, as one integral constituent having a generally C-shape, provided with an opening in the center.

X-axis slider 29 is formed in a shape of a frame having elongated through-opening 29a extending in Y-axis direction in the center, and is adapted to be driven in X-axis direction between rear bed 21 and cross beam 27 by using a combination of a motor and a ball screw or a linear motor along X-axis guides (not shown) formed in rear bed 21 and cross beam 27.

Y-axis slider 31 is adapted to be driven in Y-axis direction by using a combination of a motor and a ball screw or a linear motor along Y-axis guides extending in Y-axis direction (not shown) formed on both sides of opening 29a of frame-shaped X-axis slider.

Spindle head 33 is supported on Y-axis slider 31 and is adapted to be driven in Z-axis direction by using a combination of a motor and a ball screw or a linear motor along Z-axis guide (not shown) extending in Z-axis direction, and spindle 15 is supported on spindle head 33 rotatably about a rotation axis extending in Z-axis direction.

On the other hand, work supporting side structure 17 comprises front bed 35 to be installed on the floor surface in front of rear bed 21 with chip conveyor 19 interposed therebetween, and table 37 provided on front bed 35. Table 37 is adapted to fix pallet P with work W attached thereto. Table 37 may be provided with a mechanism for rotating pallet P about a rotation axis extending in Z-axis direction.

With machine tool 11 having the construction as described above, work W supported on work supporting side structure 17 and tool T supported on spindle supporting side structure 13 are moved relative to each other in 3-axis directions of X-axis, Y-axis and Z-axis, so as to machine work W in a desired shape. Spindle supporting side structure 13 and work supporting side structure 17 are not limited to the above described construction, and may be constructed in another form as long as work W and tool T can be moved relative to each other in 3-axis directions of X-axis, Y-axis and Z-axis. For example, instead of providing spindle supporting side structure 13 with X-axis slider, work supporting side structure 17 may include a mechanism for moving work W in X-axis direction.

Chip conveyor 19 is intended to remove chips produced when work W is machined with tool T in the processing area to the outside of the processing area, and inclined plate 39 is attached to the respective ends of front bed 35 and rear bed 21 on the side of chip conveyor 19 for directing chips falling from the processing area to chip conveyor 19. Alternatively, rear bed 21 and front bed 35 need not be fixed to the floor surface, but may be formed with an interconnecting member such that the distance between them does not change. Or, rear bed 21 and front bed 35 may be formed integrally in one unit with chip conveyor 19 disposed between them.

As has been described above, spindle supporting side structure 13 and work supporting side structure 17 are constructed so as to be supported at portions on the floor surface or near the floor surface in cantilever fashion with the respective upper ends as free ends so that warp (or deflection) may be produced due to cutting load, thermal deformation, or the like, and the free upper ends, in particular, are thereby displaced to a greater extent. Since spindle supporting side structure 13 and work supporting side structure 17 are deformed independently of each other, relative distance between the upper end of spindle supporting side structure 13 and the upper end of work supporting side structure 17 becomes large if the respective deformations (warps) are opposite in direction. In such a case, there may be a large influence on relative position of work W and tool T supported on these structures, which may give rise to a large machining error.

Therefore, in machine tool 11 of the present invention, the upper end of spindle supporting side structure 13 and the upper end of work supporting side structure 17 are connected to each other with an interconnection member 41. In the present embodiment, interconnection member 41 is formed in an arched shape, but other construction such as bridging with a plurality of straight rod members or the like may be employed.

By providing such interconnection member 41, spindle supporting side structure 13 and work supporting side structure 17 can be constrained to each other and rigidity of spindle supporting side structure 13 and work supporting side structure 17 can be thereby increased to suppress occurrence of warps. As a result, rigidity of machine tool 11 sufficient to suppress occurrence of warp to a comparable level can be obtained with a structure of lighter weight. Even if warp is produced, spindle supporting side structure 13 and work supporting side structure 17 are interconnected to each other and deform in the same direction so that relative distance between the upper end of spindle supporting side structure 13 and the upper end of work supporting side structure 17 is kept approximately constant and exhibits little change. Therefore, influence of the produced warp on the relative position of tool T supported by spindle supporting side structure 13 to work W supported by work supporting side structure 17 is small, resulting in an improvement in machining precision.

Preferably, as shown in FIGS. 1 and 2, fluid channel 43 for flowing fluid is formed in the inside of interconnection member 41 so as to circulate cooling fluid supplied by cooling fluid supplying device 45 through interconnection member 41. By circulating cooling fluid in interconnection member 41, thermal deformation of interconnection member 41 can be suppressed. In particular, if temperature of the cooling fluid circulating in fluid channel 43 in interconnection member 41 can be controlled so as to be maintained within a predetermined temperature range, dimension of interconnection member 41 can be kept approximately constant in spite of the change of environmental temperature, and relative distance between the upper end of spindle supporting side structure 13 and the upper end of work supporting side structure 17 is kept approximately constant, resulting in further improvement of machining precision.

When directions of warp of spindle supporting side structure 13 and work supporting side structure 17 are opposite, tensile load or compression load may be imposed on interconnection member 41, and as a result, elongation or contraction of interconnection member 41 may be produced. Such deformation of interconnection member 41 may cause change in relative distance between the upper end of spindle supporting side structure 13 and the upper end of work supporting side structure 17. It is possible to control the temperature of the cooling fluid circulating through fluid channel 43 of interconnection member 41 so as to offset the elongation or the contraction of interconnection member 41, and thus to further improve machining precision.

In this way, with the machine tool according to the present embodiment as described above, deformation of spindle supporting side structure 13 and work supporting side structure 17 due to change of environmental temperature or cutting load can be suppressed in order to improve machining precision. Relative distance between the upper end of spindle supporting side structure 13 and the upper end of work supporting side structure 17 exhibits little change, and even if deformation is produced, influence of the deformation on machining precision can be reduced. Deformation due to self-weight of the structures and weight of the work, as well as deformation of the structures due to counter action of the motion of the mobile body, such as X-axis slider 29 and the like can also be suppressed.

Machine tool 11 according to the present invention has been described above with reference to the embodiment shown, but the present invention is not limited to the embodiment shown. For example, as long as spindle supporting side structure 13 and work supporting side structure 17 are constructed so as to be supported in a cantilever fashion, the same effect described above as in the present invention can be obtained by providing interconnection member 41 connecting upper ends thereof, and other structure than spindle supporting side structure 13 and work supporting side structure 17 shown and described above can be employed.

The invention claimed is:

1. A machine tool for machining a work by relative movement of a tool and the work, comprising:
   a spindle supporting side structure that is erected on a floor surface, for supporting movably a spindle having a tool mounted thereon along X-axis, Y-axis and Z-axis directions that are orthogonal to each other, said spindle supporting side structure having a rear bed provide on a floor surface, right and left columns erected on the rear bed, and a cross beam connecting the upper end of said right column and the upper end of said left column; and
   a work supporting side structure for supporting a work, said work supporting side structure having a front bed installed on the floor surface in opposition to said spindle supporting side structure; and
   a table provided on said front bed, and adapted to fix a pallet with the work attached thereto; and
   a plurality of interconnection members for connecting to each other the cross beam of said spindle supporting side structure and an upper part of the table of said front bed of said work supporting side structure and for constraining the spindle supporting side structure and work supporting side structure;
   wherein the interconnection members consist of two interconnection members spaced apart from each other; and
   wherein the interconnection members are formed in an arched shape, and connect the cross beam and an upper part of the table which is lower than said cross beam.

2. The machine tool according to claim 1, wherein a fluid channel is provided in an inside of said interconnection members, and temperature of fluid flowing through said fluid channel is controlled so as to maintain a constant length of said interconnection members.

3. The machine tool according to claim 2, wherein the temperature of fluid flowing through said fluid channel is controlled so as to maintain the temperature of said interconnection members within a predetermined range.

4. The machine tool according to claim 2, wherein the temperature of fluid flowing through said fluid channel is controlled so as to offset elongation/contraction deformation of said interconnection members due to external force acting upon said interconnection members.

* * * * *